United States Patent [19]

Terry et al.

[11] Patent Number: 4,888,544
[45] Date of Patent: Dec. 19, 1989

[54] BATTERY CHARGER

[75] Inventors: Brian K. Terry, Coral Spring; Steven D. Hall, Plantation, both of Fla.; Robert J. McDermott, Dubuque, Iowa

[73] Assignee: Motorola, Inc., Schaumburg, Ill.

[21] Appl. No.: 140,510

[22] Filed: Jan. 4, 1988

[51] Int. Cl.⁴ .............................................. H02J 7/04
[52] U.S. Cl. ...................................... 320/37; 320/48; 320/22
[58] Field of Search ................. 320/37, 38, 41, 22-24, 320/39, 40, 48

[56] References Cited

U.S. PATENT DOCUMENTS

| | | | |
|---|---|---|---|
| 2,456,978 | 12/1948 | Medlar | 320/38 X |
| 3,531,707 | 9/1970 | Finnegan | 320/43 |
| 3,733,534 | 5/1973 | Saslow | 320/39 X |
| 3,852,652 | 12/1974 | Jasinski | 320/30 |
| 3,963,976 | 6/1976 | Clark | 320/23 X |
| 4,006,396 | 2/1977 | Bogut | 320/2 |
| 4,394,611 | 7/1983 | Fallon et al. | 320/39 X |
| 4,554,500 | 11/1985 | Sokira | 320/37 X |
| 4,670,703 | 6/1987 | Williams | 320/22 |
| 4,672,295 | 6/1987 | Poninski | 320/23 |

Primary Examiner—R. J. Hickey
Attorney, Agent, or Firm—Daniel K. Nichols

[57] ABSTRACT

A battery charger includes a first charger for providing a first battery charging current and a second charger for providing a second battery charging current. A switch is provided for manually actuating the second charger. A timer times the second charger cycle. The timer is used to initiate the discontinuation of operation of the second charger. When the second charger is operating, the timer is inhibited from being reset. When the first charger discontinues supplying a charging current, the battery charger is conditioned to again permit actuation of the switch to reset the timer and allow operation of the second charger.

2 Claims, 2 Drawing Sheets

BATTERY CHARGER

BACKGROUND OF THE INVENTION

This invention relates to battery chargers in general and in particular to a battery charger providing a timed quick charge for use with rechargeable batteries such as nickel-cadmium batteries. Battery chargers must be capable of recharging batteries in a reasonable period of time without damaging the batteries.

One approach is to charge batteries at a sufficiently low rate so that a battery may be continually charged without damage to the battery cells. A substantial limitation of this approach is the fact that it often requires an extended period of charge time. A typical slow charge or trickle charge approach might use a 0.1 C rate, that is a rate that will require 10 hours of charging or longer to recharge the battery. While a 10 hour charge rate may avoid damage to the cells in the event the charge is continued for an extended time period, this can represent an unacceptably long charge time.

Batteries may be capable of being recharged at a higher rate, as for example, a 0.3 C or three hour rate. The problem with charging at the higher rate is that if the charge is continued for an extended period of time the battery may overheat, which can result in damage or destruction of battery cells.

Various approaches have been utilized to provide for rapid battery charging while preventing battery damage. Prior approaches include monitoring the temperature and/or voltage of the battery for terminating rapid charge. However, these approaches require the addition of monitoring circuitry within the battery and charger. Another known approach switches the charger to a higher charge rate whenever a battery is inserted into the charger. At the end of a predetermined time interval, the charger reverts to a lower or trickle charge rate. While this approach provides a relatively fast charge, potential problems may result where a substantially fully charged battery is placed into the charger, which then automatically goes into a timed rapid or quick charge cycle. It is therefore desirable to provide a charger that does not automatically go into rapid or quick charge and which further does not permit inadvertent extension of the time of the quick or rapid charge cycle.

SUMMARY OF THE INVENTION

This battery charger provides a means for manually actuating a timed quick charge and includes means for preventing inadvertent extension of the quick charge cycle. The battery charger includes a first charging means for providing a first battery charging current and a second charging means for providing a second battery charging current. A charging control means includes manually actuable means for selectively actuating the second charging means for providing the second battery charging current. A timer means is actuable by the charging control mean for timing the operation of the second battery charging means. A charge complete means is responsive to the timer means for actuating the charging control means to discontinue operation of the second charging means, and for inhibiting the charging control means from resetting the timer means when the second charging means is operating.

In one aspect of the invention, a reset means is connected to the charging control means and is responsive to discontinuation of charging by the first charging means for conditioning the charging control means to permit actuation of the second charging means. In another aspect of the invention, the reset means includes a flip-flop having a set input connected to the timer means, a reset input connected to the charge complete means and an output connected to the charging control means.

In yet another aspect of the invention, the first charging means provides a trickle charging current and the first and second charging means cooperatively provide a quick charging current when the second charging means is actuated. In still another aspect of the invention, a first indicator means is responsive to the first charging means for indicating when the first charging means is providing a charging current. A second indicator means is responsive to the second charging means for indicating when the second charging means is providing charging current. A third indicator means is responsive to the charge complete means for indicating that the operation of the second charging means is completed.

DESCRIPTION OF THE PREFERRED EMBODIMENT

Figure 1:
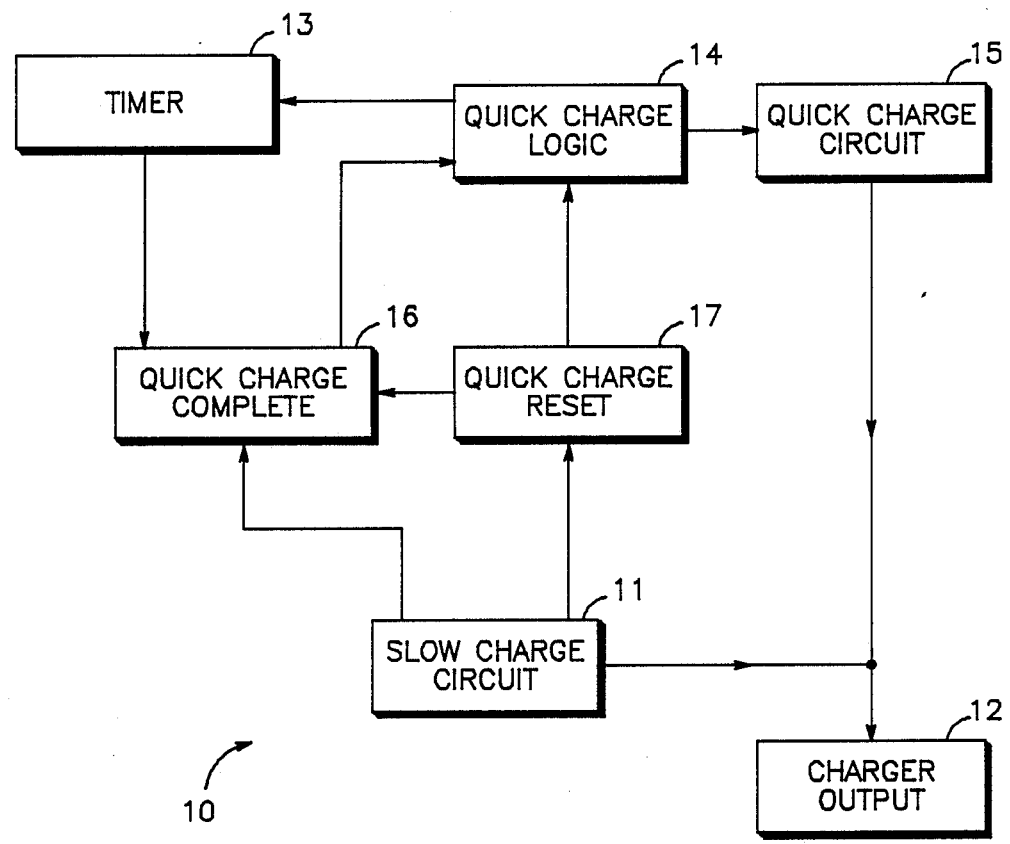
FIG. 1 is a block diagram of a battery charger in accordance with the present invention.

Referring now by characters of reference to the drawings and first to FIG. 1, it will be understood that the battery charger indicated generally by 10 includes a slow charge circuit 11, constituting first charging means, which provides the lower rate or extended charge current to the charger output 12. A timer 13, constituting timer means, is connected to a quick charger logic circuit 14, constituting charging control means, which in turn controls a quick charge circuit 15, constituting second charging means. The output of the quick charge circuit 15 is also connected to the charger output 12 for providing additional charging current.

A quick charge complete circuit 16, constituting charge complete means, is connected to a quick charge reset circuit 17, constituting reset means, both of which have outputs connected to the quick charge logic 14. The slow charge circuit 11 is connected to the quick charge complete circuit 16 and quick charge reset circuit 17 to indicate whether or not battery charging is occurring.

In operation, when a battery is connected at the charger output 12, the slow charge circuit 11 provides a trickle charging current to the charger output 12. The quick charge logic 14 is utilized to actuate the quick charge circuit 15 to provide a higher rate charger current at output 12. The quick charge logic circuit 14 also resets the timer 13 to initiate the quick charge timing cycle. At the completion of the quick charge time interval, the timer 13 signals the quick charge complete circuit 16 which in turn actuates the quick charge logic 14 to deactivate the quick charge circuit 15. As long as the slow charge continues, the quick charge reset circuit 17 does not reset. Until the quick charge reset circuit 17 has been reset, the quick charge logic 14 will not permit the charger 10 to be again placed in the quick charge mode of operation. When the battery is removed from the charger output 12, a signal is provided from the slow charge circuit 11 to the quick charge reset 17 which in turn provides a signal to reset the quick charge control logic 14. This conditions the charger 10 to permit quick charge, once a battery has again been connected to the charger output 12.

Figure 2:
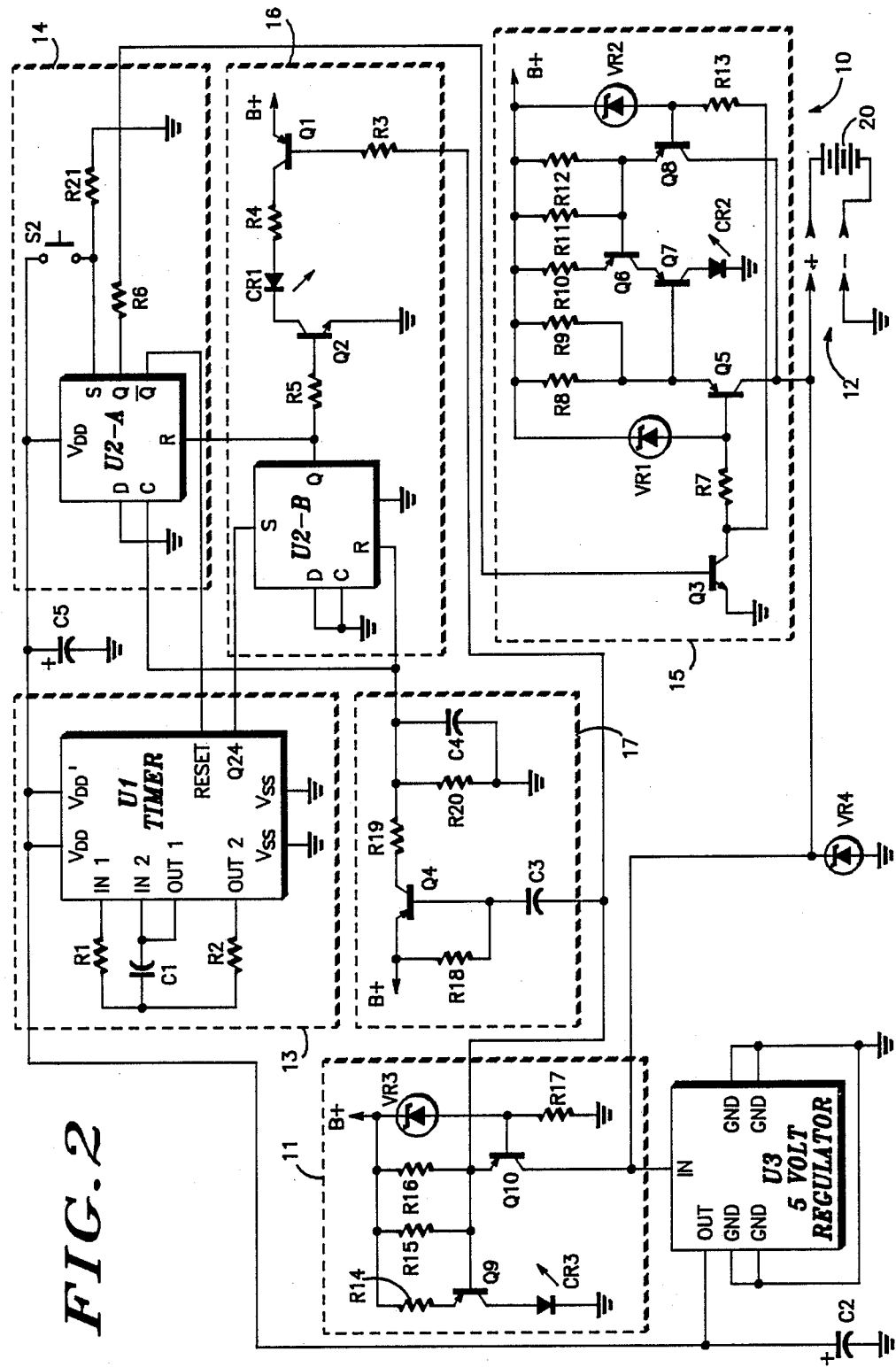
FIG. 2 is an electrical schematic diagram of the battery charger of FIG. 1.

Referring now to FIG. 2, the various circuit elements of the preferred embodiment of the charger 10 are shown in further detail. The slow charge circuit 11 includes a PNP transistor Q10 which has its emitter serially connected to an operating voltage supply, designated as B+, by parallel connected resistors R15 and R16. A zener diode VR3 is connected between the B+ supply and the base of transistor Q10 while a resistor R17 connects the base to ground. The collector of transistor Q10 is connected directly to the positive battery contact 12. The biasing of transistor Q10 provides a substantially constant current output at the battery contact 12 for a range of battery voltages. A resistor R14 is connected from the B+ supply to the emitter of a PNP transistor Q9, which has its base connected to the emitter of transistor Q10 and its collector connected to ground by a slow charge indicator LED CR3, constituting first indicator means. When a battery 20 is connected to the contacts 12 and is drawing charging current, corresponding to transistor Q10 being on, the voltage appearing at the base of transistor Q9 drops sufficiently below the B+ voltage to permit conduction through transistor Q9, which actuates the LED CR3 to indicate that the slow charge circuit 11 is operating.

The quick charge circuit 15 of the preferred embodiment is essentially formed by parallel connection of two current sources like that of the slow charge circuit 11. Two PNP transistors Q5 and Q8 have their emitters connected to the B+ supply by pairs of resistors R8 and R9 and R11 and R12 respectively. The collectors of the transistors Q5 and Q8 are both connected to the positive charger output 12. Zener diodes VR1 and VR2 are connected between the B+ supply and the bases of transistors Q5 and Q8 respectively. Resistors R7 and R13 are connected between the bases of the transistors Q5 and Q8 respectively and the collector of an NPN transistor Q3. The emitter of transistor Q3 is connected to ground and its base to the quick charge logic circuit 14. A quick charge indicator LED CR2, constituting second indicator means, is provided for indicating when the quick charge circuit 15 is operational. A resistor R10 is connected to the B+ supply and to the emitter of a PNP transistor Q6 that has its collector connected to the emitter of a PNP transistor Q7. The LED CR2 is connected between the collector of transistor Q7 and ground. The base of transistor Q6 is connected to the emitter of transistor Q8 and the base of transistor Q7 is connected to the emitter of transistor Q5.

As in the case of the slow charge circuit 11, when current is being supplied to the battery contact 12 by transistors Q5 and Q8, their emitter voltages will be sufficiently below the B+ level to turn on transistors Q6 and Q7 which will permit LED CR2 to turn ON. Both transistors Q5 and Q8 must be on in order to turn on LED CR2. It will be understood however, that the transistors Q5 and Q8 cannot supply current to the battery contact 12 unless transistor Q3 is biased on to permit current flow through zener diodes VR1 and VR2 and bias resistors R7 and R13.

Transistor Q3 is controlled by the quick charge logic circuit 14. In particular, the quick charge logic 14 includes a type D flip-flop indicated as U2-A which has its Q output connected to the base of transistor Q3. Its S or set input is connected via resistor R21 to ground and via a momentary contact switch S2, constituting manually actuable means, to a 5 volt supply provided by a regulator U3. When the switch S2 is actuated, the 5 volt supply is applied to the S input of flip-flop U2-A. If its R or reset input is low, its Q output will go high causing transistor Q3 to turn on. The Q-bar output of flip-flop U2-A is connected to the reset input of the timer 13.

Timer 13, in the preferred embodiment, comprises a 24-stage frequency divider such as a Motorola MC14521. An RC network formed by resistor R1 and capacitor C1 is connected at its two inputs. The resonant frequency of the RC network is divided by $2^{23}$ and the timer output is taken at the Q24 output and supplied to the quick charge complete circuit 16.

The VDD supply voltage for timer U1 as well as the VDD supply voltage for flip-flop U2-A and a flip-flop U2-B is provided by the regulator U3. Its input is connected to the collector of transistor Q10, but represents such a small load (i.e. high impedance) that it does not draw sufficient current to cause transistor Q10 to turn on. A large value capacitor C2 is provided at the output of regulator U3, and serves to maintain the +5 volt supply during momentary power interruptions (e.g. less than 1 second) in order to maintain the operation of timer U1 and flip-flops U2-A and U2-B during very short power interruptions. A small filter capacitor C5 is also connected to the +5 volt supply line. A large value zener diode VR4 is connected across battery contacts 12 to clip any large voltage spikes introduced at the contacts.

The quick charge complete circuit 16 includes a type D flip-flop labeled U2-B, which is preferably provided on the same I.C. as flip-flop U2-A. Flip-flop U2-B has its S or set input connected to the Q24 output of the timer 13. Its Q output is connected to the R input of flip-flop U2-A and, via a resistor R5, to the base of a NPN transistor Q2. The emitter of transistor Q2 is connected to ground and its collector is connected to a charge complete indicator LED CR1, constituting third indicator means. The B+ supply is connected to the emitter of a PNP transistor Q1 that has its collector connected via resistor R4 to the LED CR1. The base of transistor Q1 is connected via resistor R3 to the emitter of transistor Q10 of slow charge circuit 11. Indicator LED CR1 will be on indicating a complete charge, when both the Q output of flip-flop U2-B goes high turning on transistor Q2 and transistor Q1 is on. Transistor Q1 only turns on when a sufficiently low voltage is provided from the slow charge circuit 11, such as that present when a battery 20 is connected to the charger output 20. When transistor Q4 turns on, the Q outputs of flip-flips U2-A and U2-B go low. This turns off transistor Q3, disabling the quick charge circuit 15. Simultaneously, the Q-bar output of flip-flop U2-A goes high resetting timer U1. Whenever the Q output of flip-flop U2-B is high, the R input of flip-flop U2-A is held high, thereby preventing actuation of switch S2 from setting the flip-flop and instituting a quick charge cycle.

The quick charge reset circuit 17 is also connected to the emitter of transistor Q10 of slow charge circuit 11. Particularly, a capacitor C3 is coupled between the slow charge circuit 11 and the base of a NPN transistor Q4. Its emitter is connected to the B+ supply with a resistor R18 connecting the B+ supply to its base. The collector of transistor Q4 is connected via resistor R19 to the R or reset input of flip-flop U2-B, to the C or clock input of flip-flop U2-A, and to ground via the parallel connection of a resistor 20 and capacitor C4.

When the battery 20 is removed from the charger contacts 12, the voltage at the emitter of transistor Q10 rises to the B+ supply voltage, causing transistor Q4 to pass a pulse to the R input of flip-flop U2-B and clock the C input of flip-flop U2-A. If the Q output of U2-A was high, indicating that quick charge circuit was on, the pulse on the C input of flip-flop U2-A, causes its Q-bar output to go high, resetting the timer 13. Simultaneously, the pulse at the R input of flip-flop U2-B causes its Q output to go low. The charger 10 is then conditioned to again be placed in the quick charge mode when a battery 20 is connected to contacts 12. It will be understood, that unless the battery 20 is removed from the contacts 12, the quick charge reset is not actuated and the quick charge sequence cannot be reinitiated.

We claim as our invention:

1. A battery charger comprising:
    a first charging means constituting a current source for providing a substantially constant trickle battery charging current,
    a second charging means constituting at least one current source for providing an additional battery charging current,
    a charging control means including manually actuable means for selectively actuating the second charging means for providing said additional battery charging current, whereby the first and second charging means cooperatively provide a quick charging current,
    a timer means actuatable by said charging control means for timing the operation of the second battery charging means,
    a charge complete means responsive to said timer means for actuating the charging control means to discontinue operation of said second charging means, and for inhibiting said charging control means from resetting said timer means when said second charging means is operating, and
    a reset means connected to the charging control means and responsive to discontinuation of charging by said first charging means for conditioning the charging control means for permitting actuation of the second charging means.

2. A battery charger as defined in claim 1, in which:
    a first indicator means is responsive to the first charging means for indicating when said first charging means is providing said trickle charging current,
    a second indicator means is responsive to the second charging means for indicating when said second charging means is providing said additional charging current, and
    a third indicator means is responsive to the charge complete means for indicating that the operation of said second charging means is completed.

* * * * *